United States Patent [19]
Pace et al.

[11] Patent Number: 6,084,229
[45] Date of Patent: Jul. 4, 2000

[54] COMPLIMENTARY METAL OXIDE SEMICONDUCTOR IMAGING DEVICE

[75] Inventors: Matthew A. Pace, Cortland; Jeffrey J. Zarnowski, McGraw, both of N.Y.

[73] Assignee: Photon Vision Systems, LLC, Cortland, N.Y.

[21] Appl. No.: 09/039,835

[22] Filed: Mar. 16, 1998

[51] Int. Cl.[7] .................................................. H01J 40/14
[52] U.S. Cl. ................................. 250/208.1; 250/214 A; 257/292; 348/304
[58] Field of Search ........................... 250/208.1, 214 R, 250/214 LA, 214 A; 257/291–293; 330/307, 308, 59; 348/294, 301, 304, 307

[56] References Cited

U.S. PATENT DOCUMENTS

| | | |
|---|---|---|
| 5,296,696 | 3/1994 | Uno . |
| 5,471,515 | 11/1995 | Fossum et al. . |
| 5,493,423 | 2/1996 | Hosier . |
| 5,528,643 | 6/1996 | Hynecek ................................. 327/560 |
| 5,665,959 | 9/1997 | Fossum et al. ....................... 250/208.1 |

FOREIGN PATENT DOCUMENTS 0 737 003 A1   9/1996   European Pat. Off. .

*Primary Examiner*—Que T. Le
*Attorney, Agent, or Firm*—Harter, Secrest & Emery LLP; Stephen B. Salai

[57] ABSTRACT

A CMOS imager includes a photosensitive device such as a photosensitive device such as a photodiode or photogate having a sense node coupled to an FET located adjacent to the photosensitive region. Another FET, forming a differential input pair of an operational amplifier is located outside of the array of pixels. The operational amplifier is configured for unity gain and a row or column of input FETs is connected in parallel. A correlated double sampler is connected to the output of the operational amplifier for providing a fixed pattern noise free signal.

21 Claims, 4 Drawing Sheets

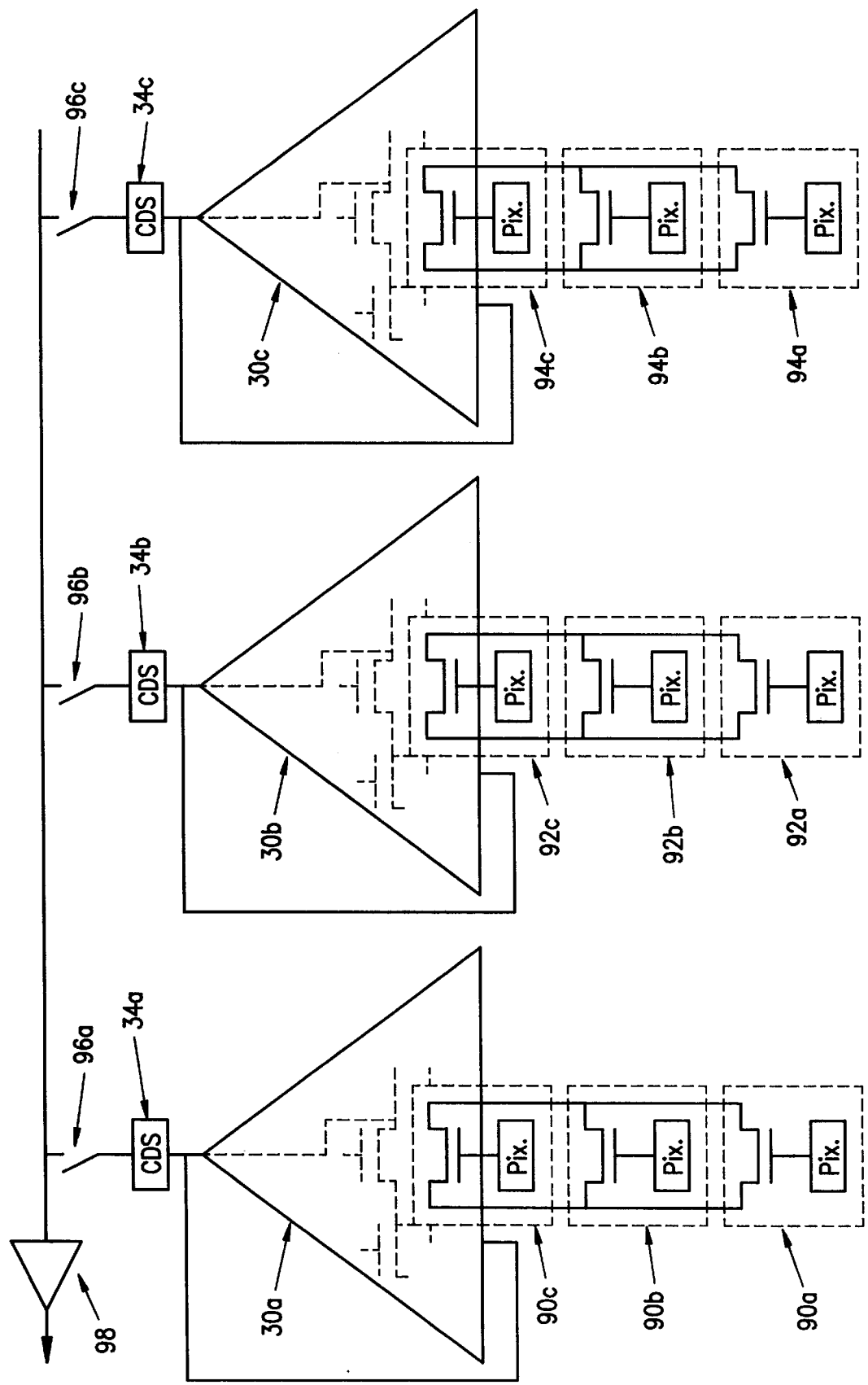

COMPLIMENTARY METAL OXIDE SEMICONDUCTOR IMAGING DEVICE

FIELD OF THE INVENTION

This invention relates generally to solid state imagers and more specifically to CMOS imagers having smaller, higher performance pixels.

BACKGROUND OF THE INVENTION

An active pixel is a semiconductor device capable of converting an optical image into an electronic signal. Active pixels can be arranged in a matrix and utilized to generate video signals for video cameras, still photography, or anywhere incident radiation needs to be quantified. When incident radiation interacts with a photosite, charge carriers are liberated and can be collected for sensing. The number of carriers collected in a photosite represents the amount of incident light impinging on the site in a given time-period.

There are two basic devices with many variants, employed to collect and sense, charge carriers in a photosite. The two basic devices are photodiodes and photogates. Variants of photodiodes include, but are not limited to: Pinned, P-I-N, Metal-Semiconductor, Heterojunction, and Avalanche. Photogate structures include: Charge Couple Devices (CCD), Charge Injection Devices (CID) and their variants that include virtual phase, buried channel and other variations that utilize selective dopants. The selective dopants are used to control charge collection and transfer underneath and between the photogate(s) and the sense node.

The solid state imagers heretofore used have been dominated by CCD's because of their low noise as compared to Photodiodes and CIDs. The low noise advantage of CCD imagers is the result of collecting the photon generated charge at the pixel site and then coupling or shifting the actual charge to an amplifier at the periphery of the array. This eliminates the need for the long polysilicon and metal busses that degrade the signal with their associated resistance and capacitance. However, the low noise of the CCD requires the imager to be read in a fixed format and once the charge is read it is destroyed. The requirement of coupling the collected photon charge from the pixel to the periphery amplifier (a.k.a. CTE), requires proprietary processing steps not compatible with industry standards CMOS or BiCMOS processes.

Solid state imaging devices have developed in parallel with CMOS technology and as a result all imager manufacturers developed their own proprietary processes to maximize imager performance characteristics and wafer yield. Specialized silicon wafer processing kept imager prices relatively high. Linear active pixel sensors have been commercially produced since 1985. Beginning in the early 90's the move to transfer the proprietary processes to an industry standard CMOS processes was on. The advantages of using an industry standard process include: competitive wafer processing pricing, and the ability to provide on chip timing, control and processing electronics. By the end of the year 1992 a 512×512 CMOS compatible, CID imager with a preamplifier and CDS per column had been fabricated. The imager could either be operated as a random access 512×512 CID, or all the columns could be summed together and operated as a linear active pixel sensor.

Area arrays utilizing active pixel sensors in which a photodiode or photogate is coupled to an output source follower amplifier which in turn drives a Correlated Double Sampling (CDS) circuit, where the two outputs of the CDS cell then drives two more source followers circuits that in turn are fed into a differential amplifier are shown in U.S. Pat. No. 5,471,515. This uses source follower circuits, that typically have gains less than unity that vary from one source follower to another. The source follower gain variation is due to variations of FET thresholds. The source follower gain variation results in a pixel to pixel gain mismatch. Also, the active pixel sensors suffer gain variations due to the CDS circuit per column, when the CDS employs a source follower pair to drive its output. The resulting CDS signal and its corresponding offset can have different gains that are not correctable by the differential amplifier. Also, the source follower configuration of active pixels doesn't allow for binning of pixels.

The voltage mode of operation of prior art does not allow for binning, which, is the summation to two or more pixel signals at once.

What is needed is an imager device which has the low noise level of a CCD, the random access, and binning of a CID, and uniform gain and response from all pixels.

BRIEF DESCRIPTION OF THE DRAWINGS

FIG. 4 is a schematic illustration of a matrix of pixels connected to incorporate a full operational amplifier per pixel forming an Active Column Sensor.

DETAILED DESCRIPTION OF THE INVENTION

Figure 1:
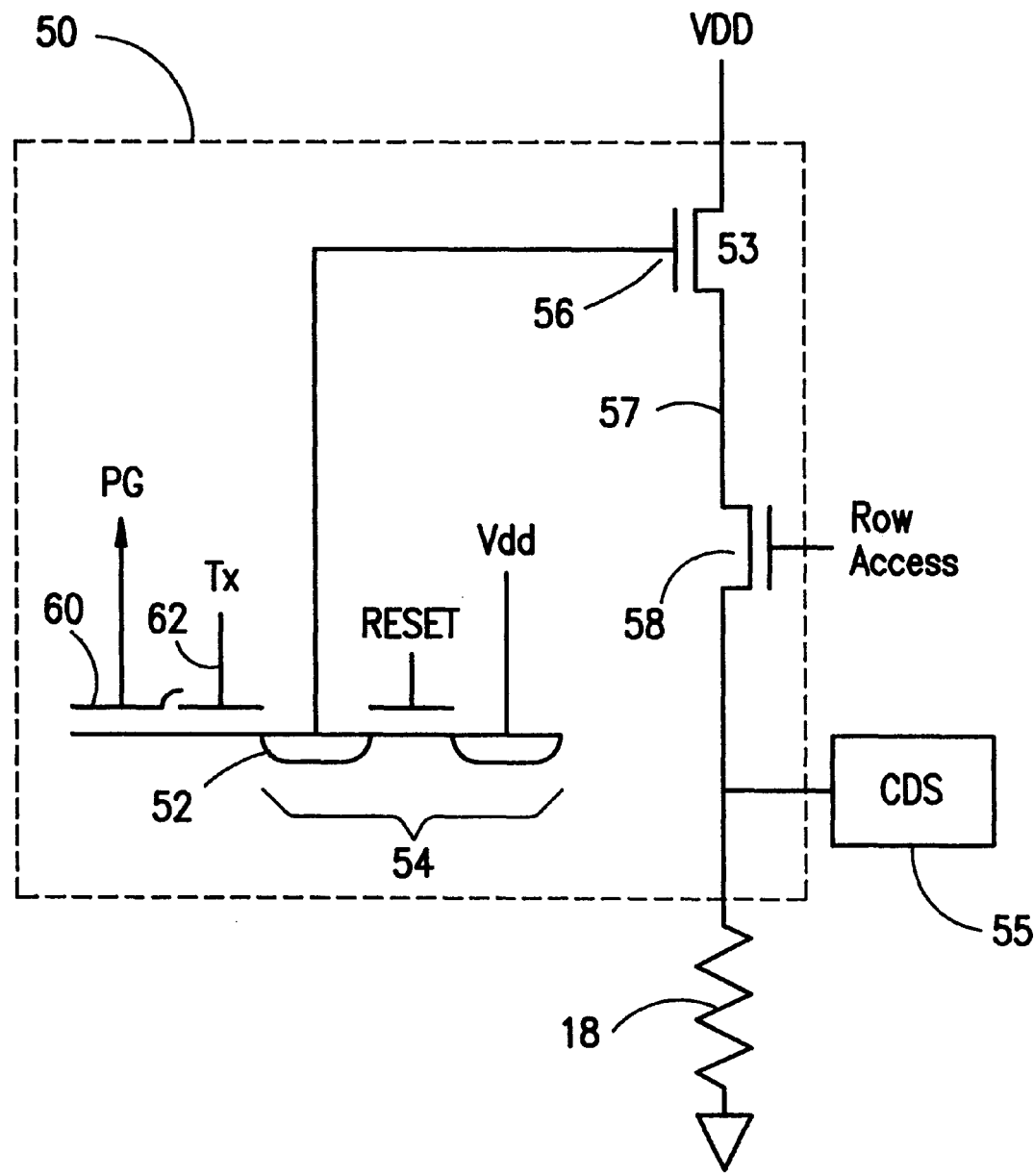
FIG. 1 is a prior art double polysilicon active pixel sensor.

Before discussing the Active Column Sensor (ACS) circuit of FIG. 2 of the present invention and described in conjunction with a discussion of ACS below, it will be useful to discuss the structure of a typical double-polysilicon active pixel sensor of prior art as shown in FIG. 1.

In FIG. 1 each pixel 50 has a photosite 60 that has an output FET 53 configured as a source follower. The source follower 53 is used to drive a subsequent signal conditioning circuitry, such as a Correlated Double Sampled Circuit (CDS) 55. The gain through a source follower 53 is less than unity. If the source follower located at the pixel site 50 has a given gain other pixels and their respective source followers in the same column may or may not have the same gain. The technique relies on wafer processing for all FETs in the array to have the same threshold. It isn't uncommon for FET thresholds, during operation, to vary by 100 mV for a linear active pixel array.

The active pixel 50 of the prior art includes a photogate 60 and a transfer gate 62 that are used to couple photo generated charge onto the floating diffusion node 52 which is connected to the gate 56 of source follower 53. The drain of the output FET 53 is connected directly to a power supply rail VDD. The source follower output FET is in turn connected to the source 56 of row access FET 58. When the row access FET 58 is selected for reading, the FET 58 is turned on, allowing output FET 53 to be connected to a load 18 and drive the CDS circuitry 55 directly.

Figure 2:
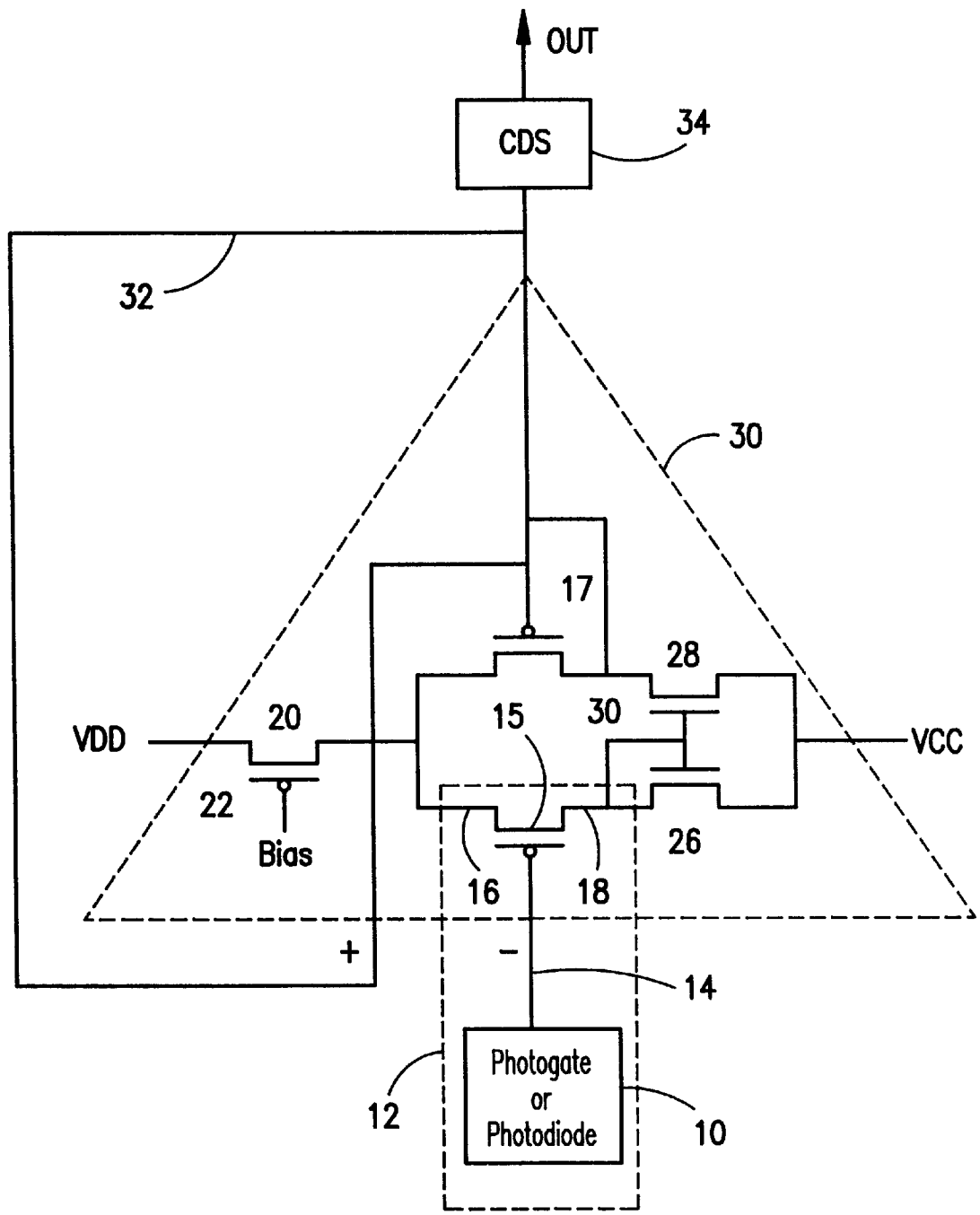
FIG. 2 is an active column sensor in accordance with this invention.

FIG. 2 is a schematic diagram of a pixel 12 in accordance with the present invention in which the threshold variations from pixel to pixel of the prior art are eliminated. All pixels 12 in a row or column are in parallel and for simplicity only one is shown. Pixel 12 which can consist of any photosensitive device 10 is coupled to an FET 15 to isolate the pixel from the readout circuitry. The FET 15 is one FET of a differential input pair of an operational amplifier 30 that includes FET 24. For simplicity, in FIG. 2 the amplifier circuit 30 is configured as a positive feedback unity gain amplifier. A feedback path 32 connects the output of amplifier 30 to input 17 which in this case is the gate of FET 24. The amplifier 30 could be configured to have gain, a full differential input or any operational amplifier configuration as the application required. The fixed gain of amplifier 30 eliminates the gain variability of the prior art. The output of the unity gain amplifier is connected to a Correlated Double Sampler (CDS) which is utilized to eliminate any fixed pattern noise in the video.

A current source 20 comprising an FET 22 has its source connected to a power source VDD and its drain connected to the sources of differential input FETs 15 and 24.

The drains of input FETs 15 and 24 are connected to a current mirror formed from FETs 26 and 28. The gates of FETs 26 and 28 are connected together and to the source 18 of input FET 15. The sources of FETs 26 and 28 are connected to a negative power source, VCC.

The source 30 of FET 24 is the output of the differential pair and is connected to CDS 34.

The input FET 15 could be either a N channel or P channel FET as the application requires. The pixel #10 could be either a photogate or photodiode.

Figure 3:
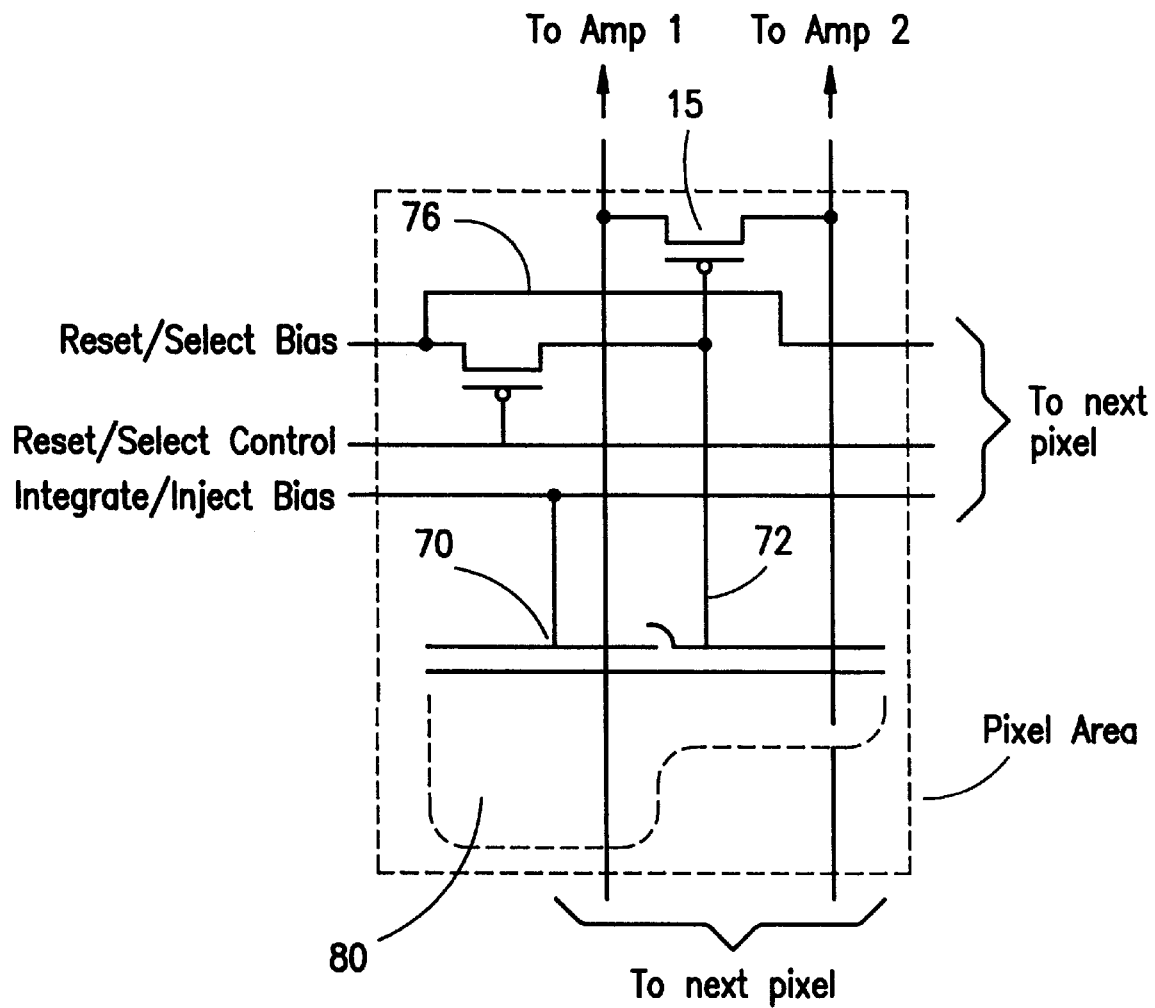
FIG. 3 is an implementation of a pixel in accordance with the invention.

FIG. 3 is a detailed schematic of pixel 12 of the active column sensor shown in FIG. 2. In this implementation a photogate 70 is utilized. Selection and reset of a sense node #72 is controlled by an FET 76. This Active Column Sensor pixel eliminates the separate selection/access FET 58 of prior art. All biasing and controls signals are supplied from the periphery of the pixel array.

The pixel can be operated in the following manner. An N type substrate is used and the substrate is biased the most positive potential, e.g. 5.0 volts. The photogate #70 preferably a layer of polysilicon is biased to an integrate level (e.g.. 0.0 volts). The region 80 under the photogate #70 is depleted and as light strikes the immediate area, it will collect (integrate) photon generated carriers. Photogate 72 has been biased to 5.0 volts and will not collect photon generated carriers during the integration because it is biased to the same potential as the substrate. Photogate 72 is biased by selecting control FET 76 with the reset/Select Control signal. In this configuration control FET 76 is a P channel FET that is selected by a negative signal relative to the substrate, for example 0.0 volts. During integration FET 76 is selected, the photogate is biased by the reset/select bias that preferably is at 5.0 volts. After a predetermined integration time period the pixel is read.

Reading the pixel is preferably accomplished in the following manner. The reset/select control is changed to 2.5 volts, causing the region beneath photogate #72 to be depleted, and the background level is read. Reset/select FET 76 is turned off by setting the reset/select control to 5.0 volts. Photogate 70 has its potential removed, and in this example 5.00 volts. Reading the signal will occur as the collected photon generated charge transfers from the region beneath photogate 70 to the region beneath photogate 72. The transferred photon generated charge modulates the gate of input FET 15, according to the amount of collected.

Fixed Pattern Noise (FPN) can be eliminated from the video information by utilizing CDS circuit 34. The first sample applied to the CDS circuit is the background level. The signal information is then applied to the CDS. The difference of the two signals provides for a fixed pattern noise free signal.

FIG. 4 is a schematic diagram of an array of pixels in accordance with this invention. A plurality of pixels 90*a*, 90*b*, 90*c* form a first column of the array, and similar columns 92*a–c* and 94*a–c* complete the array. Within each column, the pixels are connected with their output FETs in parallel, the combination forming the first one of the differential input pair of operational amplifier 30. In all other respects, amplifiers 30*a*, 30*b* and 30*c* are identical to FIG. 2. Each amplifier 30 is connected to a CDS 34*a*, 34*b*, and 34*c* respectively. The outputs of CDS 34*a, b, c* are connected through column select switches 96*a*, 96*b*, and 96*c*, the common terminals of which are connected to output buffer 98 which can be a source follower, or a more complex signal conditioner as required by the specific application.

While the invention has been described in connection with a presently preferred embodiment thereof, many modifications and changes may be apparent to those skilled in the art without departing from the true spirit and scope of the invention, which is intended to be defined solely by the appended claims.

We claim:

1. An imaging device, comprising:
   a focal plane imaging array of pixels defined within a periphery, the array having a row axis and a column axis, each one of said pixels including a region which converts incident radiation into an electric charge;
   a plurality of unitary, differential-input, amplifiers, each amplifier having a plurality of first input transistors, one first input transistor located at each of a plurality of pixels within the periphery, and a second input transistor located outside the periphery of the array and connected to the first input transistors so as to create a feedback loop.

2. The imaging device of claim 1, where the amplifiers are row amplifiers.

3. The imagine device of claim 1, where the amplifiers are column amplifiers.

4. The imaging device of claim 1, in which the plurality of first input transistors of pixels in a line are connected in parallel.

5. The imaging device of claim 1, where the plurality of first input transistors are FETs.

6. The imaging device of claim 1, comprising a selection transistor at each pixel and a control signal generator located outside the periphery of the array and connected to the selection transistor for selecting or deselecting the pixel for connection to the amplifier.

7. The imaging device of claim 6, whereby the control signal generator can simultaneously select two or more pixels in a line for connection to the amplifier.

8. The imaging device of claim 1, where the array of pixels is formed in a monolithic semiconductor substrate.

9. The imaging device of claim 1, where the amplifier has an open loop gain large enough so that the feedback loop controls the closed loop gain, and the resulting close loop gain is not significantly altered by variances in characteristics of the first input transistor.

10. The imaging device of claim 1, wherein the amplifier is configured for unity gain.

11. The imaging device of claim 1, further comprising a current source connected to the first and second input transistors.

12. The imaging device of claim 1, further comprising a current mirror connected to the first and second input transistors.

13. The imaging device of claim 1, further comprising a signal processor connected to an output of the amplifier.

14. The imaging device of claim 13, in which the signal processor comprises a correlated double sampler.

15. The imaging device of claim 1, in which the region which converts incident radiation into an electric charge comprises a photogate.

16. The imaging device of claim 15, further comprising a sense node adjacent the photogate.

17. The imaging device of claim 16, in which the photogate and the sense node are at least substantially light transmissive.

18. The imaging device of claim 17, in which the photogate and the sense node comprise layers of polysilicon.

19. The imaging device of claim 16, further comprising a control transistor connected to the sense node for controlling collection and sensing of charge.

20. The imaging device of claim 1, in which the region which converts incident radiation into an electric charge comprises a photodiode.

21. The imaging device of claim 20, further comprising a control transistor connected to the photodiode for controlling collection and sensing of charge.

* * * * *